United States Patent [19]

Uchida et al.

[11] Patent Number: 5,548,462
[45] Date of Patent: Aug. 20, 1996

[54] PROTECTIVE CIRCUIT

[75] Inventors: Tetsuro Uchida; Kazuhide Ohira, both of Kanagawa, Japan

[73] Assignee: Mitsumi Electric Co., Ltd., Tokyo, Japan

[21] Appl. No.: 329,703

[22] Filed: Oct. 26, 1994

[30] Foreign Application Priority Data

Dec. 29, 1993 [JP] Japan ................... 5-076031 U

[51] Int. Cl.⁶ .................................. H02H 7/10
[52] U.S. Cl. ..................... 361/18; 361/56; 361/91
[58] Field of Search ........................ 361/18, 56, 91

[56] References Cited

U.S. PATENT DOCUMENTS 3,582,713  6/1971  Till ................................. 361/18

Primary Examiner—Todd DeBoer
Attorney, Agent, or Firm—Whitham, Curtis, Whitham & McGinn

[57] ABSTRACT

A protective circuit unit includes an analog switch connected to a DC power line which is connected to the power source circuit of said electronic device and a main constant voltage diode connected in parallel to the DC power line, wherein an input applied to a control terminal of the analog switch is controlled by current flowing in the constant voltage diode so as to turn off the analog switch when a supply voltage is higher than a predetermined value.

20 Claims, 1 Drawing Sheet

PROTECTIVE CIRCUIT

BACKGROUND OF THE INVENTION

1. Field of the Invention

This invention relates to a protective circuit unit for an electronic device, and more particularly to a protective circuit unit for a mobile electronic device installed on a motor vehicle or the like.

2. Related Art

Sometimes, a mobile electronic device operated on the battery of a motor vehicle suffers from a difficulty that an abnormal voltage higher than the rated voltage such as 12 V or 24 V may be applied to it depending on, for instance, the variations in speed of the engine. In order to protect the electronic device from being damaged by the abnormal voltage, a protective circuit is provided for the mobile electronic device.

A protective circuit is as shown in FIG. 3. In FIG. 3, reference numeral 1 designates a positive power line; 2, an input terminal connected to the positive electrode of a battery; and 3, an output terminal connected to the power circuit of the electronic device. A fuse 4, a varistor 5, a surge absorbing filter made up of a choke coil 6 and a capacitor 7, and diode 8 are connected between the input terminal 2 and the output terminal 3 in the stated order. The diode 8 is to prevent the electronic circuit from being damaged when the power source is connected with the polarity reversed.

The electrical system of a motor vehicle sometimes suffers from a surge voltage of the order of 100 V to 200 V depending on, for instance, the variations in speed of the engine. Therefore, the varistor 5 is employed to limit the input voltage to about 80 V to 100 V. In the case where the abnormally high voltage lasts for a relatively long time, the fuse is blown to protect the electronic circuit. An impulsive surge voltage is absorbed by the surge absorbing filter made up of the choke coil 6 and the capacitor 7. In addition, in the electronic device, the withstand voltage of the power circuit is set to around 100 V.

That is, in the conventional mobile electronic device, the withstand voltage of the power circuit is set to about 100 V with the absorption of surge voltage made by the choke coil and the capacitor taken into consideration. As a result, in the mobile electronic device, the components are bulky, and the power source is also bulky. Hence, the mobile electronic device is unavoidably high in manufacturing cost.

SUMMARY OF THE INVENTION

An object of the present invention is to provide protective circuit which is improved to make it possible to reduce the withstand voltage of the power circuit of the electronic device, and to reduce the size and manufacturing cost of the latter. However, this requirement cannot be satisfied without solution to the technical problems concerned.

Another object of the present invention is to provide a protective circuit for an electronic device whose operating characteristic is not affected by the following circuit.

According to an aspect of the present invention, there is provided a protective circuit unit for a mobile electronic device comprising an analog switch connected in series to a DC power line which is connected to the power source circuit of the electronic device; and a constant voltage diode connected in parallel to the DC power line, so that an input applied to the control terminal of the analog switch is controlled by current flowing in the constant voltage diode, to turn off the analog switch when a supply voltage is higher than a predetermined value.

According to another aspect of the present invention a protective circuit for an electronic device comprising: an analog switch connected in series to one of a pair of DC power lines connected to the power source circuit of the electronic device; a first constant voltage diode connected between the one DC power line and the control terminal of the analog switch; and a second constant voltage diode connected between the control terminal of the analog switch and the other DC power line, so that an input applied to the control terminal of the analog switch is controlled by current flowing in the first constant voltage diode, and the start voltage of the analog switch is determined by the second constant voltage diode.

The (semiconductor) analog switch connected to the power line is controlled by the constant voltage diode connected in parallel to the power line. When no abnormally high voltage is produced in the power line, the constant voltage diode is in "off" state, and the analog switch is in "on" state, so that supply voltage is applied to the power source section of the electronic device. When abnormally high voltage is produced therein, the constant voltage diode is turned on to change the input applied to the control terminal of the analog switch, so that the analog switch is turned off, to interrupt the application of the supply voltage.

Thus, the start voltage of the analog switch can be freely determined by changing the Zener voltage of the second constant voltage diode.

DETAILED DESCRIPTION OF THE PREFERRED EMBODIMENTS

Preferred embodiments of the invention will be described with reference to the accompanying drawings.

First Embodiment

Figure 1:
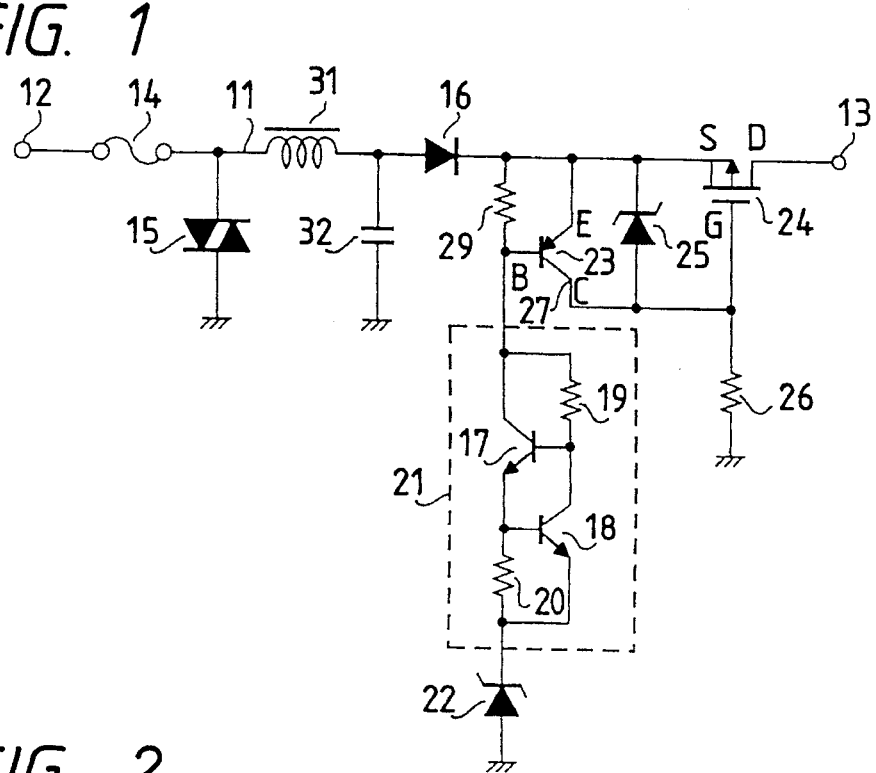
FIG. 1 is a circuit diagram showing an example of a protective circuit unit for an electronic device, which constitutes a first embodiment of the invention.

FIG. 1 shows an example of a protective circuit for an electronic device, which constitutes a first embodiment of the invention.

In FIG. 1, reference numeral 11 designates a positive DC power line; 12, an input terminal connected to the positive electrode of a battery (not shown); 13, an output connected to the power circuit of an electronic device; 14, a fuse connected between the input terminal 12 and the power line 11; 15, a varistor connected between the positive DC power line 11 and ground (or a negative DC power line); 16, a damage preventing diode which is adapted to prevent the circuit elements of the electronic circuit from being damaged when the power source is connected thereto with the polarity reversed; 17 and 18, NPN transistors; 19 and 20, resistors; and 21, a current limitation circuit formed by the NPN transistors 17 and 18 and the resistors 19 and 20. The base of the transistor 17 is connected to the collector of the transistor 18, and the emitter of the transistor 17 is connected to the base of the transistor 18. The collector and base of the transistor 17 are connected through the resistor 19 to each other, and the base and emitter of the transistor 18 are connected through the resistor 20 to each other.

Further in FIG. 1, reference numeral 22 designates a constant voltage diode such as a Zener diode which is connected between the emitter of the transistor 18 forming the current limitation circuit 21 and ground (the negative DC power line); 23, a PNP transistor having its emitter connected directly to the cathode of the damage preventing diode 16 and its base connected through a resistor 29 to the cathode of the diode 16; 24, a P-type FET (field-effect transistor) serving as an analog switch, the FET 24 having its source connected to the cathode of the diode 16 and its gate connected to the collector of the transistor 23; 25, a constant voltage diode such as a Zener diode which is connected between the source and gate of the FET 24; and 26, a resistor connected between the gate of the FET 24 and ground.

Further in FIG. 1, reference numeral 31 denotes a choke coal connected between the positive DC power line 11 and the diode 16; and 32, a capacitor connected between the connecting point of the choke coil 31 and the diode 16 and ground.

The protective circuit operates as follows: When a surge voltage of the order of 100 V to 200 V is produced in the power source system of a motor vehicle or the like, the varistor 15 operates to limit the input voltage to about 80 V 100 V. In the case where an abnormally high voltage lasts for a relatively long time, the fuse 14 is blown to protect the circuit. An impulsive surge voltage is absorbed by the choke coil 31 and the capacitor 32.

The base voltage of the PNP transistor 23 is controlled by the constant voltage diode 22 connected to the current limitation circuit 21. The collector 27 of the PNP transistor 23 is connected to the gate of the P-type FET 24. A supply voltage is applied through the constant voltage diode 25 to the gate G of the P-type FET 24, which is grounded through the resistor 26. Switching the on and off states of the P-type FET 24 is determined according to the operating voltage of the constant voltage diode 22. The operating voltage of the other constant voltage diode 25 is set lower than the source-gate withstand voltage of the P-type FET 24. The input voltage is limited to about 80 V to 100 V by the varistor 15 so that it may not exceed the withstand voltages of the circuit elements in the protective circuit.

In the case where no surge voltage is produced in the positive DC power line, the NPN transistors 17 and 18 of the current limitation circuit 21 are rendered conductive (on) and non-conductive (off), respectively, and the PNP transistor 23 serving as an analog switch is rendered non-conductive (off). Therefore, the P-type FET 24 is turned on, so that the input terminal 12 and the output terminal 13 are electrically connected to each other, whereby electric power is supplied to the power source circuit of the mobile electronic device.

When a surge voltage higher than the operating voltage of the constant voltage diode 22 is induced in the positive DC power line 11, the constant voltage diode 22 is turned on, so that current flows from the positive DC power line 11 to ground to decrease the base voltage of the PNP transistor 23, with the result that the PNP transistor 23 is turned on. Hence, the positive DC power line 11 is electrically connected to the gate of the P-type FET 24, so that the gate voltage and the source voltage become substantially equal. Thus, the P-type FET 24 is turned off to interrupt the application of power through the positive DC power line 11, thereby to protect the power source circuit of the mobile electronic device.

When a voltage much higher is applied to the positive DC power line 11, current flows from the line 11 to ground, so that the voltage drop across the resistor 20 is increased. In this case, the NPN transistor 18 is rendered conductive (on), to limit the current flowing in the NPN transistor 17, thereby to prevent the flow of over current in the constant voltage diode 22.

Second Embodiment

Figure 2:
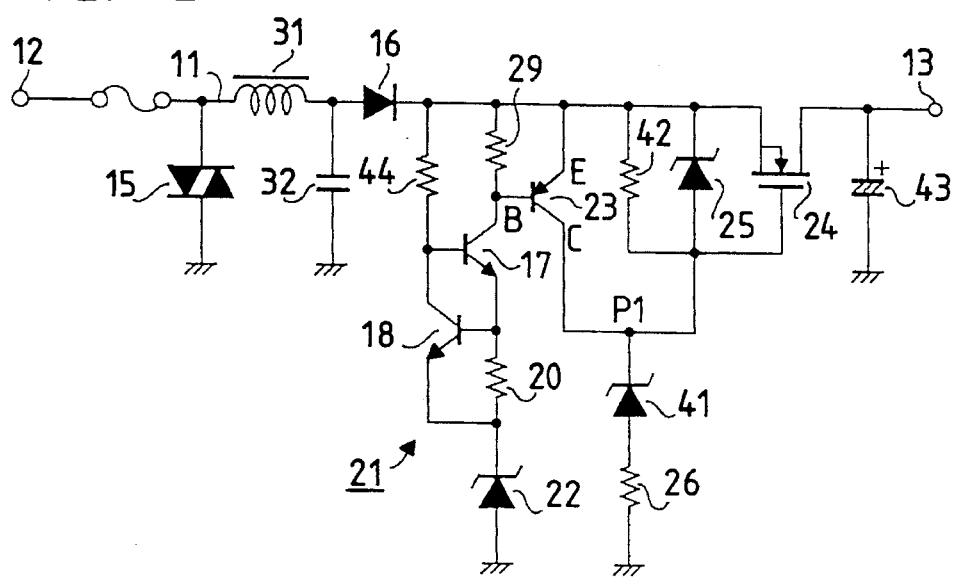
FIG. 2 is a circuit diagram showing another example of a protective circuit unit for an electronic device, which constitutes a second embodiment of the invention.
Figure 3:
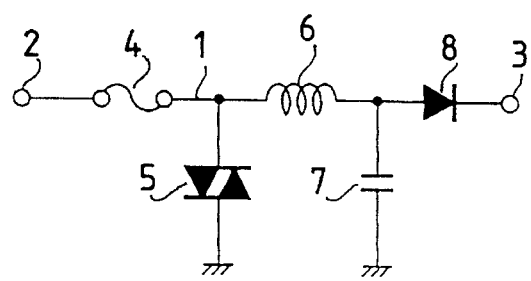
FIG. 3 is a circuit diagram showing a conventional protective circuit unit for an electronic device.

Another example of the protective circuit for an electronic device, which constitutes a second embodiment of the invention, will be described with reference to FIG. 2 in detail in which parts corresponding functionally to those which have been described with reference to FIG. 1 are therefore designated by the same reference numerals or characters.

The second embodiment is different from the first embodiment in that a constant voltage diode, namely, a Zener diode 41 is connected between the control terminal of the FET 24 serving as an analog switch and the negative DC power line.

In addition, in the current limitation circuit 21 of the first embodiment, the resistor 19 is connected between the base and collector of the transistor 17; whereas in the second embodiment the base of the transistor 17 is connected through a resistor 44 to the cathode of the damage preventing diode 16, and the collector of the transistor 17 is connected to the base of the transistor 23. The current limitation circuit 21 shown in FIG. 2 operates in the same manner as the one shown in FIG. 1. Furthermore, in the second embodiment, a resistor 42 is connected in parallel with the constant voltage diode 25, and the drain of the FET 24 is grounded through a capacitor 43.

The protective circuit operates as follows: When the gate voltage of the FET 24, i.e., the voltage at the point P1 is lower than the Zener voltage of the Zener diode 41, the diode 41 is not turned on, and therefore the FET 24 is not activated. When, on the other hand, the voltage at the point P1 is higher than the Zener voltage of the Zener diode 24, the latter 24 is turned on, so that current flows in the Zener diode 14, and the FET 24 is activated. As is apparent from the above description, the start voltage of the FET transistor can be freely determined by changing the Zener voltage of the Zener diode 41 which is a second constant voltage diode.

In the second embodiment, the operating range of the input protective circuit can be determined by the operation of the Zener diode 41 in association with the over-voltage preventing Zener diode 22.

It should be noted that the invention is not limited to the above-described first embodiment. For instance, the current limitation circuit 21 may be changed and modified in various manners without departing from the invention.

As was described above, in the embodiment of the invention, the surge voltage produced in the power source system of a motor vehicle or the like is detected, to interrupt the application of supply voltage to the mobile electronic device, and only the surge voltage is interrupted to limit the supply voltage applied to the mobile electronic device to become lower than the predetermined value. Hence, in the protective circuit of the invention, unlike the conventional protective circuit, no abnormally high voltage is provided at the output terminal, which makes it possible to reduce the withstand voltage of the power source section of the mobile electronic device, and to increase the degree of freedom both in designing the circuit and in selecting the circuit elements. And for the same reason, the mobile electronic device can be reduced both in size and in weight, and can be decreased in manufacturing cost. If the fuse and the varistor which are sufficiently rated, are used, then the fuse will not be blown; that is, a maintenance-free protective circuit can be provided.

As is apparent from the above description, the start voltage of the FET transistor can be freely determined by changing the Zener voltage of the second constant voltage diode, which increases the degree of freedom in designing the circuit. Thus, the protective circuit has a wide range of applications to electronic devices.

What is claimed is:

1. A protective circuit unit comprising:

an analog switch connected to a direct current (DC) power line which is connected to a power source circuit of an electronic device;

a main constant voltage diode connected to the DC power line, wherein an input applied to a control terminal of the analog switch is controlled by current flowing in the main constant voltage diode so as to turn off the analog switch when a supply voltage of said DC power line is higher than a predetermined value; and a current limitation circuit connected in series between said main constant voltage diode and said DC power line.

2. A protective circuit unit as claimed in claim 1, wherein the analog switch is connected to said DC power line in series between said power source circuit and said electronic device.

3. A protective circuit unit as claimed in claim 1, the main constant voltage diode is connected between the DC power line and the control terminal.

4. A protective circuit unit as claimed in claim 1, further comprising:

an auxiliary constant voltage diode connected between the control terminal and a ground, wherein a start voltage of the analog switch is determined by the auxiliary constant voltage diode.

5. A protective circuit unit as claimed in claim 1, wherein said analog switch comprises a P-type field-effect transistor.

6. A protective circuit unit as claimed in claim 1, wherein said main constant voltage diode comprises a Zener diode.

7. A protective circuit unit as claimed in claim 1, further comprising at least one resistor connected between said main constant voltage diode and said DC power line, wherein said main constant voltage diode is connected directly to said at least one resistor and to ground.

8. A protective circuit unit as claimed in claim 4, wherein said auxiliary constant voltage diode comprises a Zener diode.

9. A protective circuit unit as claimed in claim 1, wherein said current limitation circuit comprises a first resistor connected in parallel with a first transistor and a second resistor connected in parallel with a second transistor.

10. A protective circuit for coupling to an electronic device comprising:

an input terminal for inputting a first voltage;

an output terminal for outputting said first voltage;

a line connecting said input and output terminals;

means for preventing current from flowing along said line unless said line has a voltage above a predetermined voltage, said preventing means including a switch for breaking said line;

a diode connected between said line and a reference voltage; and a transistor connected between said line and said reference voltage for controlling said switch, said transistor being connected in parallel with said diode, said diode for controlling said transistor such that when said line has a voltage above said first voltage said transistor controls said switch to break said line.

11. A circuit as in claim 10, wherein said first voltage comprises an operating voltage of said circuit, said reference voltage comprises a ground voltage and said predetermined voltage comprises a voltage in a range between said first voltage and said reference voltage.

12. A circuit as in claim 10, wherein said switch comprises a P-type field-effect transistor.

13. A circuit as in claim 10, wherein said diode comprises a constant voltage diode.

14. A circuit as in claim 10, wherein said diode comprises a Zener diode.

15. A circuit as in claim 10, wherein said transistor includes a collector connected to said switch.

16. A circuit as in claim 10, further comprising at least one resistor connected between said diode and said line, wherein said diode is connected directly to said at least one resistor and to said reference voltage.

17. A circuit as in claim 10, further comprising a current limitation circuit connected between said diode and said line, wherein said diode is connected directly to said current limitation circuit and to said reference voltage.

18. A circuit as in claim 17, wherein said current limitation circuit comprises a first resistor connected in parallel with a first transistor and a second resistor connected in parallel with a second transistor.

19. A circuit as in claim 10, wherein said preventing means further comprises a second diode connected between said line and said first voltage for controlling said switch, wherein said second diode controls said switch such that said line is broken until said line comprises a voltage above said predetermined voltage.

20. A circuit as in claim 19, wherein said second diode comprises a Zener diode.

* * * * *